United States Patent [19]

Halsall

[11] 4,248,103
[45] Feb. 3, 1981

[54] STRAIGHT LINE MECHANISM

[75] Inventor: James R. Halsall, Runcorn, England

[73] Assignee: Imperial Chemical Industries Limited, London, England

[21] Appl. No.: 939,918

[22] Filed: Sep. 5, 1978

[30] Foreign Application Priority Data

Sep. 6, 1977 [GB] United Kingdom ............... 37133/77

[51] Int. Cl.³ .................... F16H 21/04; F16H 21/52
[52] U.S. Cl. ........................................ 74/103; 74/44; 74/469
[58] Field of Search ................... 74/44, 103, 104, 469, 74/105; 49/405; 248/281.1

[56] References Cited

U.S. PATENT DOCUMENTS

| 1,208,690 | 12/1916 | Stewart | 49/405 |
| 2,203,148 | 6/1940 | Holzer | 74/103 |
| 3,147,063 | 9/1964 | Miller | 346/139 |

FOREIGN PATENT DOCUMENTS

| 851443 | 6/1952 | Fed. Rep. of Germany . |
| 2254176 | 11/1973 | France . |
| 1408666 | 10/1975 | United Kingdom . |
| 1455782 | 11/1976 | United Kingdom . |
| 1469788 | 4/1977 | United Kingdom . |

OTHER PUBLICATIONS

*De Ingenieur*, E. A. Dijksman, 1970, vol. 82, W171-6.
*Instrument Practice*, J. R. Halsall, 1959, pp. 815-822.

Primary Examiner—Allan D. Herrmann
Attorney, Agent, or Firm—Cushman, Darby & Cushman

[57] ABSTRACT

Linkage mechanisms for industrial manipulators are disclosed which are based on so-called straight line mechanisms. The preferred straight line mechanism is of the conchoid type. The linkage mechanisms may be employed to move functional elements of industrial manipulators in straight lines without the use of lead screws or revolute jointed arms.

14 Claims, 11 Drawing Figures

STRAIGHT LINE MECHANISM

This invention relates to linkage mechanisms, and particularly to linkage mechanisms for industrial manipulators.

In a first known form of industrial manipulator, a first carriage running on a first set of carefully machined slides and driven by a first lead screw along a first axis is mounted on a second carriage running on a second set of carefully machined slides and driven by a second lead screw along a second axis perpendicular to the first axis, which second carriage is mounted on a third carriage running on a third set of carefully machined slides and driven by a third lead screw along a third axis perpendicular to the first and second axes. In construction and appearance this form of industrial manipulator resembles a universal milling machine tool. The lead screws and slides used in this form of industrial manipulator are expensive to construct and tend to be vulnerable to dirt and wear.

In a second known form of industrial manipulator a plurality of revolute jointed arms is connected in series and the angular rotation of each joint is controlled by a drive motor. Simultaneous co-ordinated rotation of more than one joint is often required to guide a functional element of the industrial manipulator in a straight line. Where the functional element is guided along a line which has a vertical component, the drive motor for each revolute joint guiding the functional element must be capable of performing mechanical work. Furthermore, since all the joints are generally capable of vertical angular movement, all the drive motors must be of approximately the same power.

We have now developed a linkage mechanism employing the co-ordinated movement in different directions of a plurality of "straight-line mechanisms", hereinafter SLM. Linkage mechanisms according to the invention may be employed for example to resolve the input motion applied to a control lever of an industrial manipulator, e.g. a manual control lever of an industrial manipulator, into separate components with respect to two axes, which components may provide input signals to appropriate drives, or to guide a functional element of an industrial manipulator along a desired path as defined with respect to two axes. Where a plurality of linkage mechanisms according to the invention are associated to guide a functional element of an industrial manipulator in three dimensions, only the drives of the SLM's which guide vertical movement have to perform mechanical work, the drives of SLM's which guide movement in a horizontal plane have to overcome only friction.

By "straight-line mechanism" we mean a mechanism in which a member, rotatable about an axis which passes through the member (hereinafter referred to as a "rotatable member") is associated with a second member, both said members being mounted such that when a rotary movement of the rotatable member occurs, the said axis moves in a first straight line or a geometric point on the second member moves in a second straight line, which straight line movement occurs in a plane perpendicular to the axis and may be resolved into two mutually perpendicular components in the said plane to provide a minor component on a line passing through the axis and the geometric point.

By "industrial manipulator" we mean a machine capable of moving a functional element to a position which is determined by commands received by the industrial manipulator. The commands may come from an operator, e.g. via a manual control lever or a keyboard, or they may come from a memory unit.

By "functional element" we mean cutting tool, assembly tool, gripper, load supporting element e.g. platform, welding electrode, paint spray or other component well known in the production engineering art.

The present invention provides a linkage mechanism for an industrial manipulator comprising at least two SLM's as hereinbefore defined, arranged such that a movement in a plane of a geometric point on the linkage mechanism is effected by or effects a co-ordinated rotary movement of the rotatable members of the SLM's the perimeter of the said plane being determined by the straight lines, or by lines parallel thereto, along which the straight-line movement of the said SLM's occurs.

Preferably the plane is rectangular since for a combination of any particular SLM's a rectangular plane has the largest area over which the geometric point may be guided.

SLM's which may be employed in the linkage mechanism of the present invention include many of those well known in the mechanical art, e.g. Tchebicheff's mechanism, and Peaucellier's cell and variations thereon. Preferably the SLM is of the so-called "approximate" type, more preferably the SLM is of the "conchoid" type.

By "conchoid" type SLM we mean an SLM in which a rotatable member, rotatable about a pivot axis which passes through the rotatable member, is pivotally attached to a second member at an attachment, and the second member is oriented by orienting means located at a fixed distance from the said axis, the said members and orienting means being mounted and the distance of the attachment from the axis, the said fixed distance and the length of the second member being chosen such that on rotary movement of the rotatable member through an angle $\theta$ the said attachment describes an arc of a circle with respect to the said axis and the said axis and orienting means move in first and second straight lines respectively or a geometric point on the second member moves in a third straight line which straight line movement occurs in a plane perpendicular to the axis and may be resolved into two mutually perpendicular components in the said plane to provide a minor component on a line passing through the axis and the geometric point.

Conchoid-type SLM's and their proportions are known. For example, the distance of the attachment from the axis may be 1r unit and the axis may be located between the orienting means and the said third straight line of movement at a distance of 3r units from both. Preferably however, the conchoid type SLM has the same, or substantially the same relative dimensions, as the SLM disclosed in Instrument Practice, August, 1959, pages 815–822, namely that the distance of the attachment from the axis is 1r unit and the orienting means is located at a distance 2r units from the axis and $6r \pm 0.2r$ units from the said third straight line of movement.

The conchoid-type SLM having the preferred dimensions has the advantages over other conchoid-type SLM's in that it is more compact for a given accuracy and given amount of straight-line movement. Furthermore, the amount of straight-line movement is approximately linearly proportional to the angle $\theta$ through which the rotatable member is rotated for rotations between ±1.5 radians, thus facilitating control of the SLM. Also the preferred conchoid-type SLM may be readily incorporated in various forms of pantograph linkages in order to accept linear inputs as described in Instrument Practice, August 1959, pages 819–822.

The invention will be further described by reference to the accompanying drawings. In the drawings.

Figure 1:
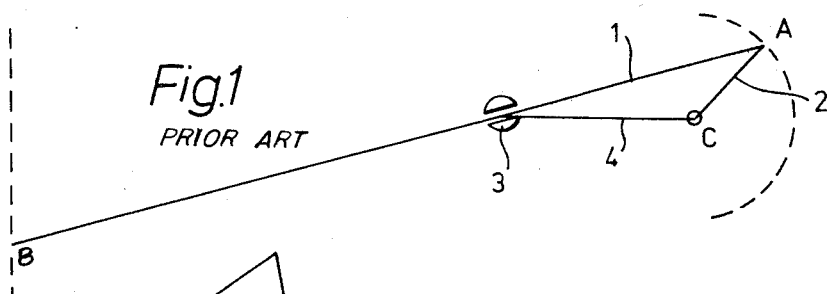
FIG. 1 is a diagrammatic side elevation of a known conchoid-type SLM having the preferred dimensions.

In FIG. 1, a conchoid-type SLM having the preferred dimensions as hereinbefore disclosed consists of a second member in the form of a lever 1, pivotally attached at one end (A) to a rotatable member in the form of a crank 2 and slidably held in orienting means in the form of a bush 3. Bush 3 is pivotally mounted on a fixed link 4. Crank 2 is pivotally mounted at its end on fixed link 4 at a fixed distance from the bush 3 so that it may rotate about pivot axis (C) to allow the end (A) of the lever to describe an arc (dotted line) of a circle. The crank 2 has a length of 1r unit, the lever 1 has a length of 9r units and the bush 3 is mounted at a fixed distance 2r units from the crank. On rotary movement of the crank 2 in the plane of the paper, the free end of the lever 1, and hence a geometric point B located at the said end, moves in a straight line (dotted line) which is in the plane of the paper and which is perpendicular to the fixed link 4 at a distance 6r units from the bush 3. Alternatively, the crank and the fixed link may be mounted such that where point B is fixed, rotary movement of the crank causes the pivot axis C and the bush 3 to move in straight lines parallel to the dotted straight line in FIG. 1.

Figure 2:
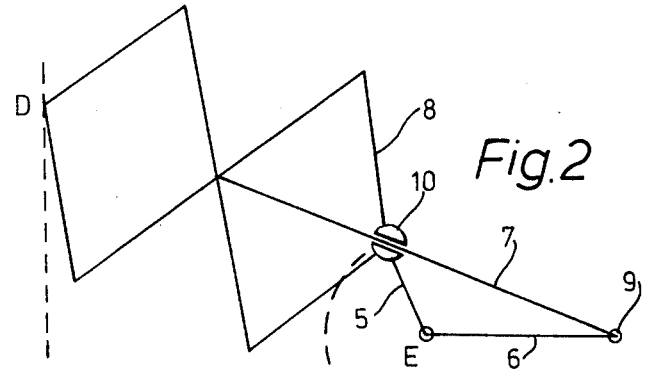
FIG. 2 is a diagrammatic side elevation of a compacted modification of the SLM shown in FIG. 1.

It will be appreciated by those skilled in the art that compacted versions of the conchoid-type SLM shown in FIG. 1 may be prepared. For example FIG. 2 shows one compacted SLM having an overall length of 6r units. In FIG. 2 a rotatable member in the form of a crank 5 of length 1r unit is mounted on a fixed link 6 of length 2r units. A second member consists of a lever 7 of length 4½r units and a lazy tongs 8, the centre point of which is attached to one end of the lever 7. One end of the lever is mounted on orienting means in the form of a pivot 9 at one end of the fixed link 6 and the lever slides through a sliding bush 10 to which the lazy tongs 8 and the crank 5 are pivotally attached. On rotary movement of the crank 5 about axis E the sliding bush 10 describes an arc of a circle (dotted line) and a geometric point D at the free end of the lazy tongs 8 moves in a straight line (dotted line) at a distance 6r units from the pivot 9.

Alternatively the crank and the fixed link may be mounted such that where point D is fixed rotary movement of the crank causes pivot axis E and the orienting means 9 to move in straight lines parallel to the dotted straight line in FIG. 2.

It will be appreciated that the orientation of an element which is fixedly attached to the geometric point of the second member of the SLM shown in FIG. 1 such that it moves in a straight line will change as the second member moves, which change may be undesirable. For example, where the element is a load-supporting platform, it will tilt and may discharge a load supported thereon. Where the element is pivotally attached to the geometric point, the orientation of the element may be maintained, e.g. where the element is a platform, a frame may be provided to stop the platform tilting such that its orientation is maintained. However, a frame often tends to restrict movement of the functional element. Preferably orientation of an element is maintained by attaching a plurality of SLM's in parallel to the element.

It will be appreciated that the linkage mechanism may comprise a compound train. For example, a first pair of SLM's operating in parallel and mounted on a base may move a first element, e.g. a platform, along a first axis and a second pair of SLM's mounted on the first element may move a second element, e.g. a platform, along a second axis. Preferably the axes are orthogonal since this maximises the area over which the second platform may move. However, compound trains tend to be extensive and bulky and subject to cummulative positioning errors due to a large number of links between the base and the functional elements.

Figure 3:
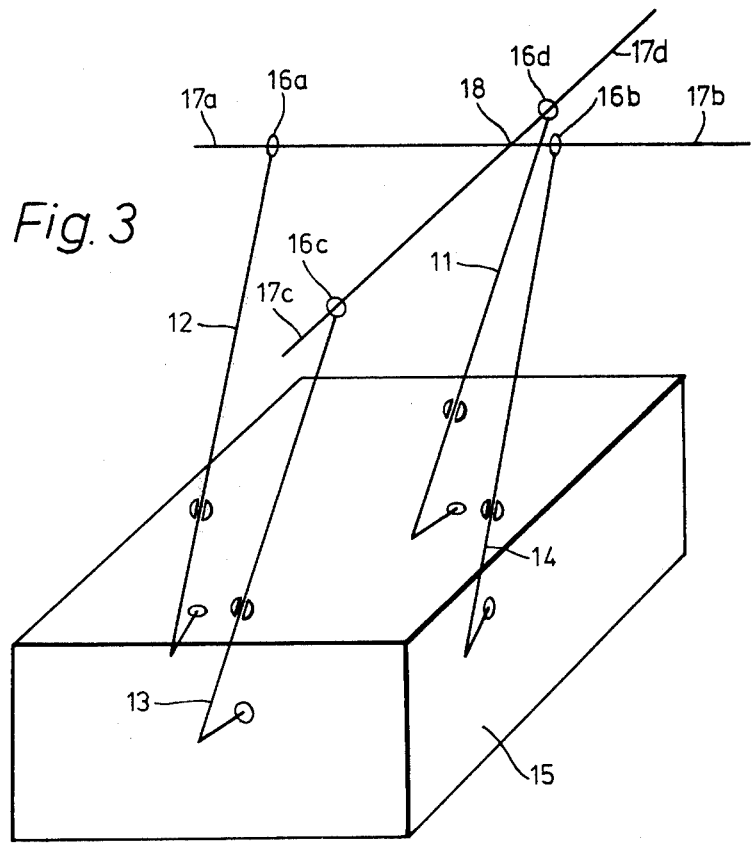
FIG. 3 is a diagrammatic perspective view of a linkage mechanism according to the invention comprising a plurality of discrete SLM's as shown in FIG. 1.

To reduce the extent, the bulk and the positioning errors of a linkage mechanism according to the invention, at least a pair of SLM's, the straight-line movement of which is in a first direction, is preferably co-extensive with at least a pair of SLM's the straight-line movement of which is in a second direction. For example, in FIG. 3, four SLM's as shown in FIG. 1 11, 12, 13 and 14 are mounted on a base 15 and on bushes 16 through which the arms 17 of a cross-piece 18 slide. The SLM's 11 and 13 are capable of moving the cross-piece along a first axis while the arms 17a and 17b slide through bushes 16a and 16b. The SLM's 12 and 14 are capable of moving the cross-piece along a second axis perpendicular to the first axis while the arms 17c and 17d slide through buses 16c and 16d.

More preferably the extent, the bulk and the positioning errors of a linkage mechanism according to the invention may be reduced by combining the second member of a first conchoid-type SLM having the preferred dimensions with the second member of a second conchoid-type SLM having the preferred dimensions, the straight-line movements of the said two SLM's not being parallel, to form a "double-ended" SLM. In a double-ended SLM the two second members are combined such that a rotary movement of the rotatable members of the said two SLM's is effected by or effects a movement of the orienting means of the first SLM in a plane parallel to and spaced 6r units from a plane through the orienting means of the second SLM.

Figure 4:
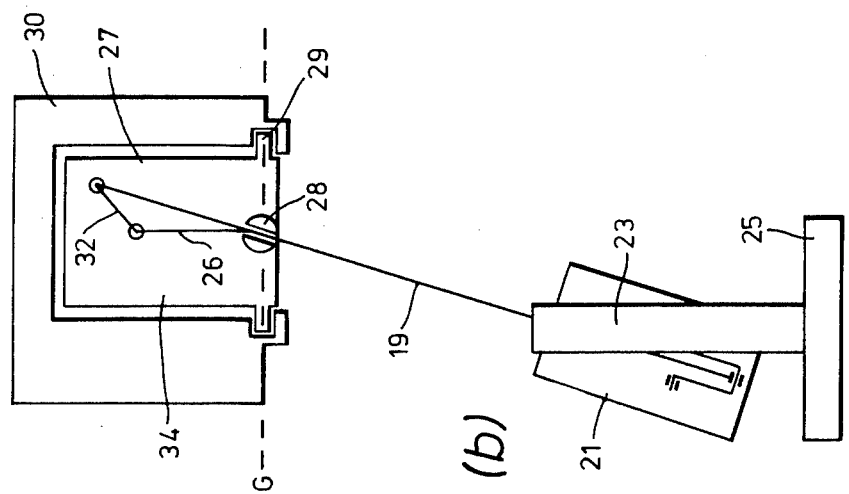
FIG. 4 is a diagrammatic representation of a so-called "double-ended" SLM, (a) from the front and (b) from the side suitable for use in a linkage mechanism according to the invention.
Figure 4:
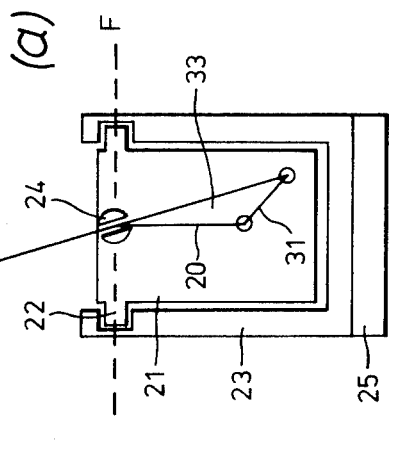

For example, in FIG. 4 two SLM's 33 and 34 having the same relative dimensions as the SLM shown in FIG. 1, are combined about a common lever 19 of length 12r units. Orienting means in the form of a bush 24 is pivotally mounted on the fixed link 20 which is a component of a frame 21. The frame 21 is provided with spigots 22 and supported in bearing brackets 23 mounted on a base 25 such that the SLM 33 can be tilted about a first axis (dotted line F) which passes through the spigots 22. Orienting means in the form of a bush 28 is pivotally mounted on the fixed link 26 which is a component of a frame 27. The frame 27 is provided with spigots 29 and supported in a platform 30 such that the SLM 34 can be rotated about a second axis (dotted line G) which passes through the spigots 29. A line parallel to the first axis intersects the second axis at right angles. Rotation of the cranks 31 and 32 moves the bush 28 along a line in a plane which is parallel to a plane through the bush 24 and tilts the SLM 33 about the first axis and tilts the SLM 34 about the second axis. It will be appreciated that to prevent uncontrolled tilting of the platform two double-ended SLM's can be coupled in parallel.

Figure 5:
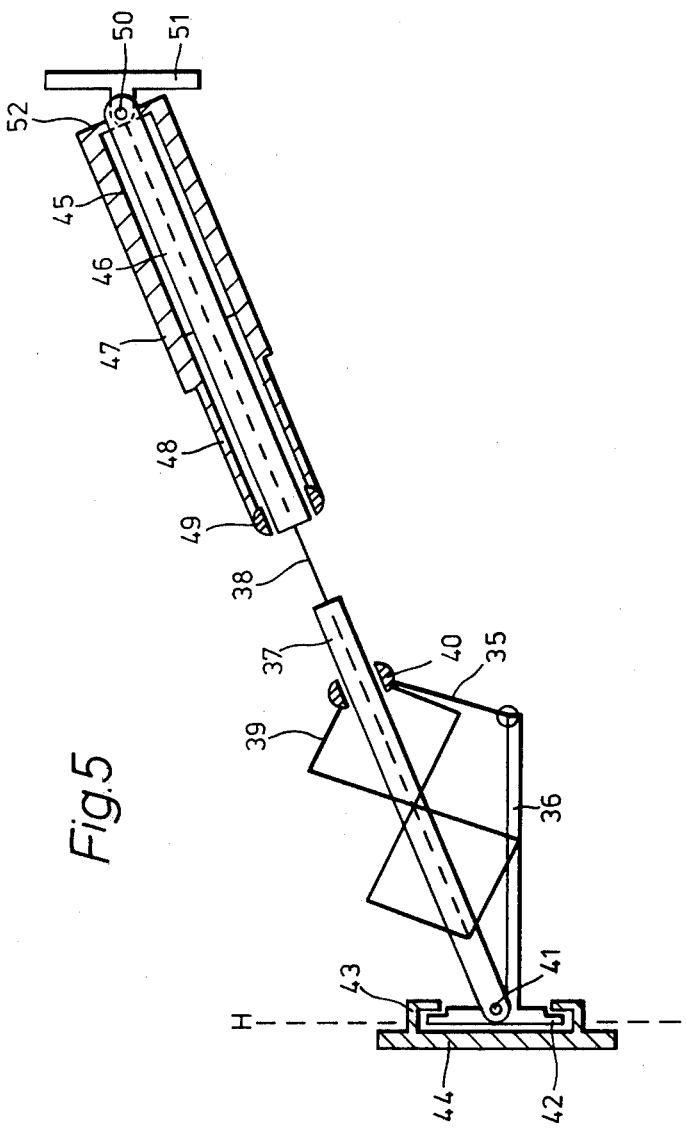
FIG. 5 is a diagrammatic side elevation of a compacted double-ended SLM.

It will be appreciated that a compacted version of a double-ended SLM may be formed. For example, in FIG. 5 a first rotatable member in the form of a crank 35 of length 1r unit is rotatably mounted about an axis perpendicular to the plane of the paper on a fixed link 36 of length 2r units. A second member consists of a tube 37 of length 3r units, a rod 38 of length 6r units slidable therein and projecting from one end thereof and a lazy tongs 39, the centre point of which is attached to the mid-point of the tube 37 and one end of which is attached to the inner end of the rod 38. Slots are provided in the wall of the tube to allow this attachment to move along the tube. The second member is pivotally attached to the rotatable member 35 by a sliding bush 40 through which the tube 37 slides and is attached to orienting means in the form of a pivot 41 at the end of the fixed link 36 distant the crank 35. The fixed link 36 is provided with spigots 42 and supported in bearing brackets 43 mounted on a base 44 such that the fixed link can be pivoted about an axis in the plane of the paper (dotted link H). The other end of the rod 38 is attached to one end of a lazy tongs 45, the centre point of which is mounted on a tube 46 through which the rod 38 slides. The tube 46 is pivotally attached to a second fixed link 47 by a pivot 52. A second rotatable member in the form of a crank 48 is mounted rotatably about an axis in the plane of the paper on the fixed link 47. The crank 48 is attached to a sliding bush 49 which slides on the outside of the tube 46 and is attached to the free end of the lazy tongs 45. The fixed link 47 is provided with spigots 50 and supported in a platform 51 such that the fixed link can be pivoted about an axis perpendicular to the plane of the paper. Rotation of the cranks 35 and 48 moves the pivot 52 in a plane perpendicular to the plane of the paper, and parallel to dotted line H.

Figure 6:
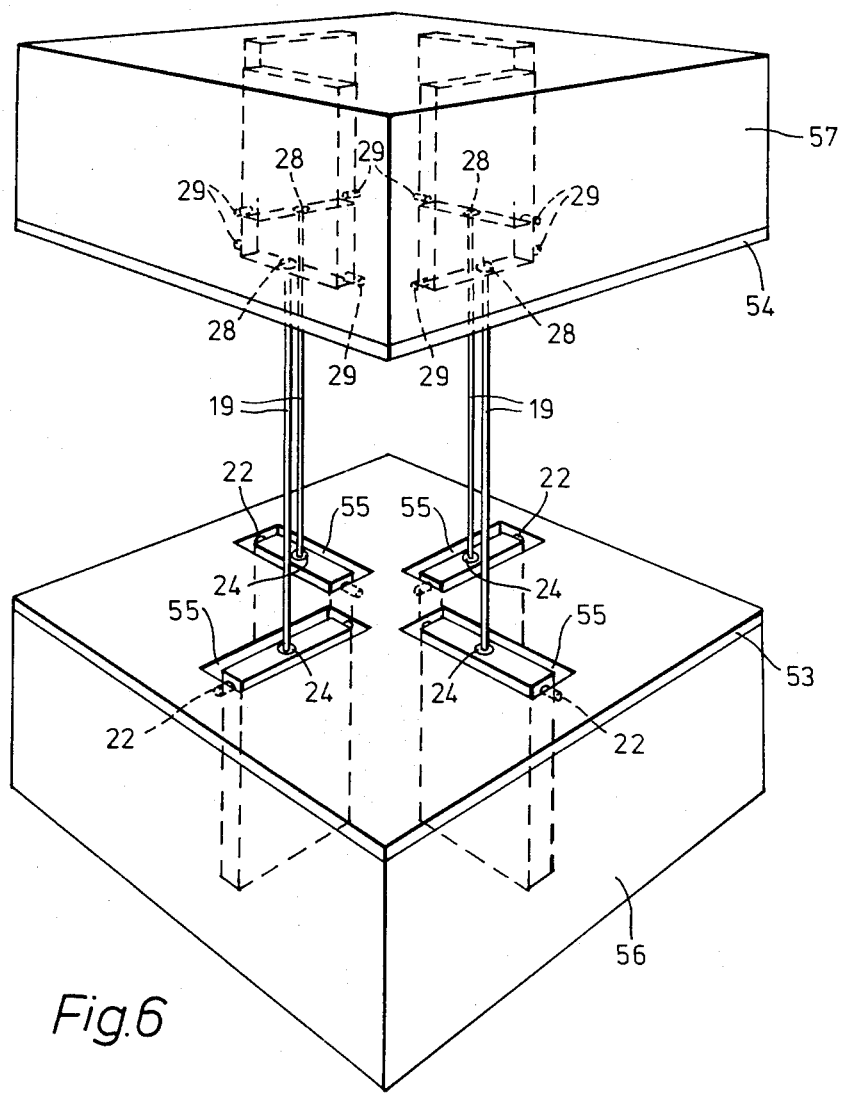
FIG. 6 is a diagrammatic perspective view of a linkage mechanism according to the invention comprising four double-ended SLM's.

FIG. 6 is a diagrammatic perspective representation of a linkage mechanism according to the invention comprising four of the double-ended SLM's illustrated in FIG. 4. The spigots 22 and 29 of the SLM's are mounted in bearing (not shown) in base 53 and a platform 54 with the levers 19 protruding through slots 55 in the base and the platform. The bushes 24 of the SLM's mounted on the base 53 are separated by a distance of 6r units from the bushes 28 of the SLM's mounted on the platform 54. The base 53 is located on a sump 56 in which drive motors (not shown) may be located. The platform 54 is provided with a cover 57 to protect drive motors (not shown) located on the platform. A functional element e.g. a loading platform, may be attached to the cover 57. On providing appropriate signals to the drive motors, the cover 57 may be moved to the corresponding position in a plane parallel to a plane through the bushes 24.

Figure 7:
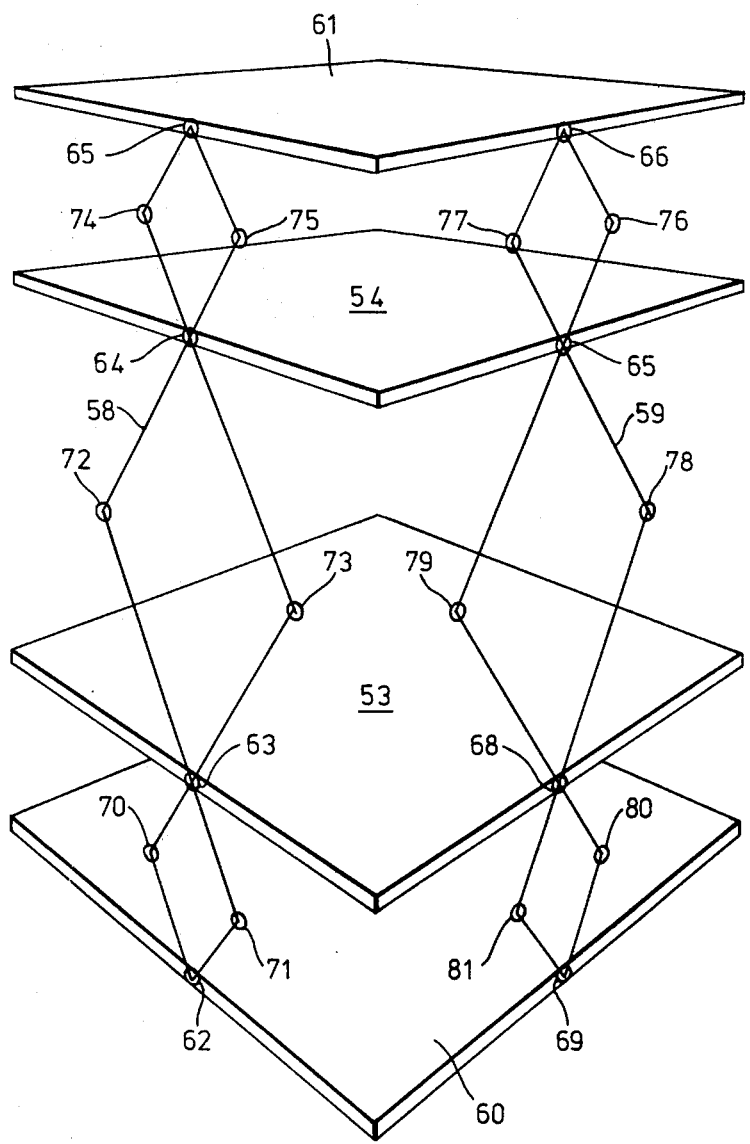
FIG. 7 is a diagrammatic perspective view of a linkage mechanism according to the invention having increased movement.

It will be readily appreciated by those skilled in the art that the linkage mechanism of FIG. 6 may be modified by combination with a pantograph to increase the movement of a functional element for a given rotary movement of the rotatable members. In FIG. 7 the base 53 and the platform 54 of the linkage mechanism shown in FIG. 6 (the four double-ended SLM's, the sump and the cover are omitted for clarity) are attached by four lazy tongs, only two of which 58, 59 are shown, to a foundation 60 and a plate 61 such that the base, the platform and the plate may move in parallel planes with respect to the foundation. The lazy tongs are attached to the base, the platform, the foundation and the plate by universal joints 62–69. The joints 70–81 of the lazy tongs intermediate the base, the platform, the foundation and the plate are plane joints. For a given rotation of the rotatable member the platform 54 moves a distance 1 m with respect to the base 53 and the plate 61 and a functional element (not shown) attached thereto moves a distance 2 m with respect to the foundation 60.

Figure 8:
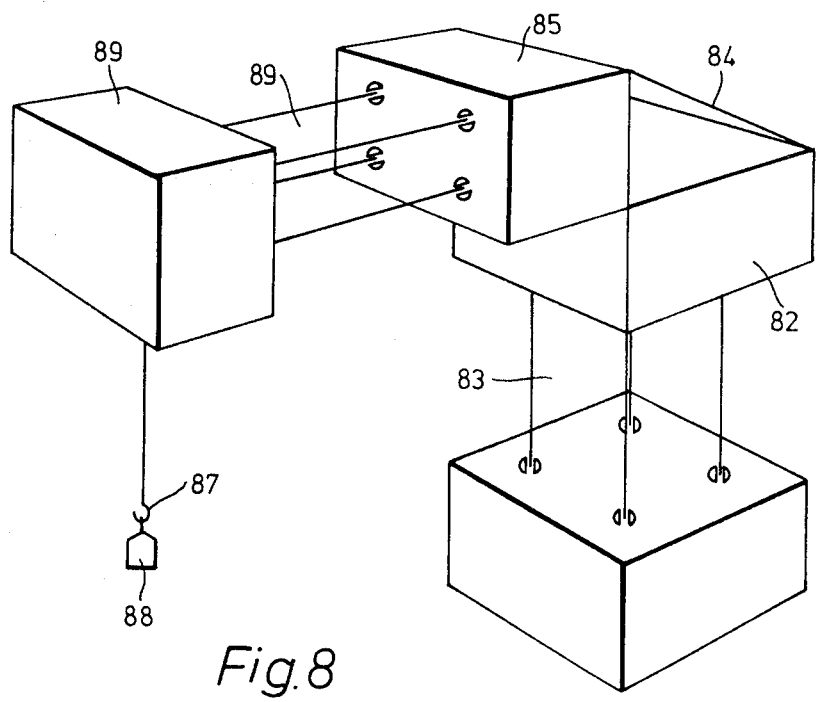
FIG. 8 is a diagrammatic perspective view of a manipulator comprising two linkage mechanisms according to the invention.

A plurality of the linkage mechanisms shown in FIG. 6 may be combined as in FIG. 8 such that the functional element of a manipulator may be moved along three mutually perpendicular axes. The cover 82 of one linkage mechanism 83 is attached by ties 84 to the base 85 of a second linkage mechanism 86. A functional element, e.g. a hook 87, depends from the cover 89 of the second linkage mechanism and supports a load 88. Linkage mechanism 83 is capable of guiding the load in a horizontal plane and the linkage mechanism 86 is capable of guiding the load in a vertical plane.

It will be readily appreciated that where it is desired to employ two double-ended SLM's in parallel, they may be combined. For example, the second member of a first double-ended SLM may be in the form of a rod which is coaxially located in a tube which forms the second member of a second double-ended SLM.

Figure 9:
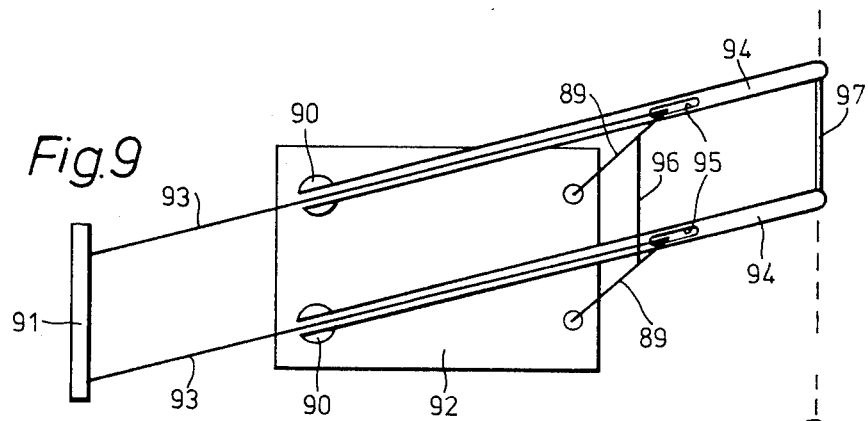
FIG. 9 is a diagrammatic representation of two SLM's arranged and coupled in parallel.

FIG. 9 shows two SLM's arranged and coupled in parallel to give a compact arrangement. The SLM's are derived from the conchoid type SLM shown in FIG. 1 and have the same basic geometry as the SLM's shown in FIG. 1, i.e. the rotatable member 89 has a length r and the axis of the rotatable member is positioned a fixed distance 2r from the orienting means 90. The active length of the arrangement, that is the distance from a fixed support frame 91 to the straight line path of movement shown by the dotted straight line in FIG. 9 is between 6r and 6.2r. The SLM's are mounted on a movable element 92 and the second member of each SLM is formed by a rod 93 slidable within a tube 94. One end of each rod is pivotally attached to the frame 91 with its opposite end pivotally attached to the rotatable member 89. The tubes are provided with longitudinally extending slots 95 to allow attachment of the rods 93 to the rotatable members 89. The rotatable members are coupled by a coupler 96 and the ends of the tubes are joined by a connector 97. Each tube is fixed to an orienting means 90. Upon rotation of the rotatable members 89 about their axis of rotation, the SLM's move as a unit and the connector 97 moves in a straight line in a plane perpendicular to the axes. A functional element can be attached to the connector 97 for movement in a straight line at a distance between 6r and 6.2r from the frame 91.

Figure 10:
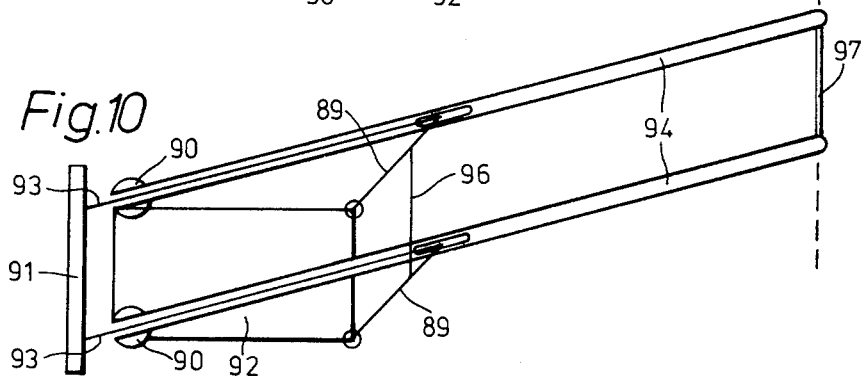
FIG. 10 is a diagrammatic representation of a modification of the assembly shown in FIG. 9.

FIG. 10 shows a modification of the arrangement as shown in FIG. 9 in which the length of the rotatable member 89 and its distance from the orienting means 90 is the same as in FIG. 9 and in which the length of the rods 93 is substantially 3r and the length of the tubes 94 is substantially 6r such that the connector 97 moves in a straight line at a distance between 6r and 6.2r from the frame 91 and such that when the rods and tubes are perpendicular to the frame 91, the ends of the tubes distant the connector 97 abut the frame 91.

Figure 11:
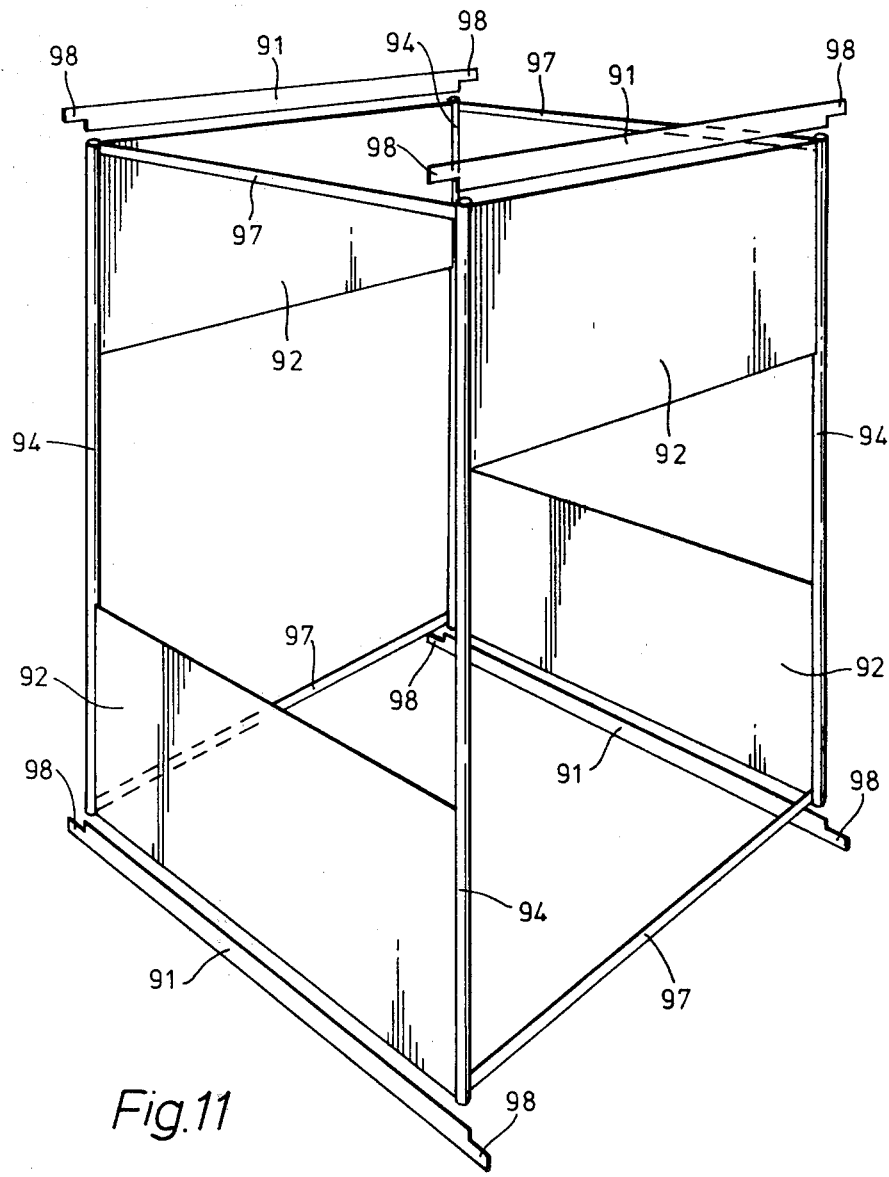
FIG. 11 is a diagrammatic representation of an embodiment of a compacted linkage mechanism according to the invention.

It will be appreciated that the ends of the tubes 94 of the arrangement shown in FIG. 10 may be adapted such that they are common to two such arrangements and FIG. 11 is a diagrammatic representation of a so-called "two-motion" assembly employing four of the arrangements as shown in FIG. 10 and employing common tubes. In FIG. 11 the tubes 94 of length substantially 6r of four of the arrangements shown in FIG. 10 are shared (the rotatable members, orienting means and rods are omitted for clarity). Preferably the length of the tubes is between 6r and 6.2r to prevent interference between the two opposing ends of the assemblies with which the tube is associated. Each frame 91 is provided with spigots 98 such that it may be mounted in appropriate mounting means to allow the element 92 to be rotated about an axis parallel to the straight line along which the connector 97 associated therewith moves. The overall height of the assembly is 6r units.

Two linkage mechanisms according to the invention may be employed in an industrial manipulator. One of the linkage mechanisms may be a manual input control lever and the second linkage mechanism may guide a functional element. Movement of the control lever may be reproduced by the functional element, thus facilitating control. It will be appreciated that by the use of appropriate components the reproduction may be to any desired scale, e.g. the movement may be increased or reduced.

Known methods of driving linkage mechanisms, e.g. electric, hydraulic, pneumatic, etc. are applicable to linkage mechanisms according to the invention. Where a linkage mechanism according to the present invention is employed to guide a functional element of an industrial manipulator, the type of drive mechanism employed may depend on the environment in which the industrial manipulator is employed. Typically where a cheap robust drive is required, e.g. in a warehouse or on civil engineering sites, hydraulic control may be employed. Where oil presents a fire hazard, e.g. in a furnace, then the drive is typically electric. Where electric sparks present an explosion hazard, e.g. in a chemical plant, then typically pneumatic drive is employed. Typically a servomechanism drive circuit is employed, which may be any standard design typically used on numerically controlled machine tools.

I claim:

1. A linkage mechanism for an industrial manipulator comprising at least two straight line mechanisms, each straight line mechanism comprising a rotatable member (31, 32) and a second member (19) both said members being mounted such that when a rotary movement of the rotatable member occurs the axis (C) which passes through the rotatable member moves in a first straight line or a geometric point (B) on the second member moves in a straight line, which straight line movement occurs in a plane perpendicular to the axis and may be resolved into two mutually perpendicular components in the said plane to provide a minor component on a line passing through the axis and the geometric point; said straight line mechanisms arranged such that movement in a plane of a geometric point on the linkage mechanism is effected by or effects a coordinated rotary movement of the rotatable member of the straight line mechanisms, the perimeter of the said plane being determined by the straight lines, or by lines parallel thereto along which straight line movement of the said straight line mechanisms occurs.

2. A linkage mechanism according to claim 1 comprising at least two pairs of associated straight line mechanisms, one of the pairs (11 and 13) effecting movement in a first direction and the other of said pairs (12 and 14) effecting movement in a second direction.

3. A linkage mechanism according to claim 2 in which said first and second directions are at right angles to one another.

4. A linkage mechanism according to claim 1 comprising a pair of conchoid-type straight line mechanisms having a common second member (19) such that rotary movement of the rotatable members of said straight line mechanism is effected by or effects a movement of the orienting means (24) of one of the straight line mechanisms in a plane parallel to a plane through the orienting means (28) of the other straight line mechanism.

5. A linkage mechanism according to claim 4 in which the common second member comprises a tube (37) and a lazy tongs arrangement (39) associated with each straight line mechanism and a rod (38) slidable within the tubes and attached at its opposite ends to the ends of the respective lazy tongs.

6. A linkage mechanism according to claim 4 including a plurality of pairs of straight line mechanisms with each pair having a common second member (19), the straight line mechanisms capable of supporting and moving a functional element relative to the orienting means (24) of one of the straight line mechanisms without tilting in a plane parallel to a plane through the said orienting means.

7. A linkage mechanism according to claim 6 incorporating a pantograph (58) to increase the movement of the functional element.

8. A linkage mechanism according to claim 6 or 7 in which the plurality of pairs of straight line mechanisms are disposed and arranged to move the functional element along three mutually perpendicular axes.

9. A linkage mechanism according to claim 2 in which each of the said pairs comprises first and second straight line mechanisms arranged and coupled in parallel, the said second member of each straight line mechanism comprising a tube (94) slidable on a rod (93), one end of the rod being fixed and the other end of the rod being attached to the rotary member (89) of the straight line mechanism at a position intermediate the ends of the tube such that movement of the rotary members effects a linear displacement of the free end of each tube in a direction normal to the axes of rotation.

10. A linkage mechanism according to claim 9 in which the ends of the tubes of said first and second straight line mechanisms are coupled (see 96) to the corresponding ends of a further first and second straight line mechanism to achieve a compact parallel coupled arrangement.

11. A linkage mechanism according to claim 10 including a plurality of such compact parallel coupled arrangements disposed and arranged to move a functional element along three mutually perpendicular axes.

12. A linkage mechanism for an industrial manipulator comprising at least a first conchoid-type straight-line mechanism associated with a second conchoid-type straight-line mechanism in each of which straight-line mechanisms a rotatable member (31, 32), rotatable about a pivot axis which passes through the rotatable member, is pivotally attached to a second member (19) at an attachment, and the second member is oriented by orienting means (24, 28) located at a fixed distance from the said axis, the said members and orienting means being mounted and the distance of the attachment from the axis, the said fixed distance, and the length of the second member (19) being chosen such that on rotary movement of the rotatable member (31, 32) through an angle the said attachment describes an arc of a circle with respect to the said axis and the said axis and orienting means move in first and second straight lines respectively or a geometric point on the second member moves in a third straight line which straight line movement occurs in a plane perpendicular to the axis and may be resolved into two mutually perpendicular components in the said plane to provide a minor component on a line passing through the axis and the said geometric point, the said straight line mechanisms having a common second member (19) and being arranged with the said plane of the second straight-line mechanism such that rotary movement of the said rotatable members is effected by or effects a movement of the orienting means of the first straight line mechanisms in a plane parallel to a plane through the orienting means of the second straight line mechanism.

13. A linkage mechanism according to claim 12 in which, in each of said straight-line mechanisms, the distance of the attachment from the axis is 1r unit and the orienting means is located at a distance 2r units from the axis and 6r±0.2r units from the said third straight line of movement.

14. A linkage mechanism according to claim 12 in which said plane of the first straight-line mechanism and said plane of the second straight-line mechanism are at right angles to one another.

* * * * *